United States Patent [19]
Barkan et al.

[11] Patent Number: 5,536,930
[45] Date of Patent: Jul. 16, 1996

[54] APPARATUS AND METHOD FOR SENSING POSITIONAL ORIENTATIONS OF A PORTABLE TERMINAL

[75] Inventors: Edward Barkan, Miller Place; Paul Dvorkis, Stony Brook; David Goren, Ronkonkoma; Daniel R. McGlynn, Brooklyn, all of N.Y.

[73] Assignee: Symbol Technologies, Inc., Holtsville, N.Y.

[21] Appl. No.: 277,694

[22] Filed: Jul. 18, 1994

Related U.S. Application Data

[63] Continuation-in-part of Ser. No. 892,889, Jun. 3, 1992, and Ser. No. 113,831, Aug. 9, 1993.

[51] Int. Cl.⁶ .................................................... G06K 7/10
[52] U.S. Cl. ...................... 235/472; 235/439; 235/470; 235/440; 235/462; 382/313; 364/709.11
[58] Field of Search ........................ 235/462, 439, 235/472, 470, 454, 440; 364/709.11, 709.14, 709.15; 341/22, 23, 33, 34; 340/712, 718; 382/58, 59; 345/173, 175, 207

[56] References Cited

U.S. PATENT DOCUMENTS

| | | | |
|---|---|---|---|
| 4,251,798 | 2/1981 | Swartz et al. | 382/59 X |
| 4,672,215 | 6/1987 | Howard | 235/472 |
| 5,021,640 | 6/1991 | Muroi | 235/462 |
| 5,063,508 | 11/1991 | Yamada et al. | 235/472 X |
| 5,142,131 | 8/1992 | Collins, Jr. et al. | 235/462 X |
| 5,189,291 | 2/1993 | Siemiatkowski | 235/462 X |
| 5,471,042 | 11/1995 | Kirkeby et al. | 235/472 |

FOREIGN PATENT DOCUMENTS

| | | | |
|---|---|---|---|
| 2103688 | 4/1990 | Japan | 235/462 |

*Primary Examiner*—John Shepperd
*Assistant Examiner*—Michael G. Lee

[57] ABSTRACT

A portable terminal includes a housing and a sensor for sensing different specific positional orientations of the housing. In one positional orientation sensed by the sensor, the terminal performs a first function. In another positional orientation sensed by the sensor, the terminal performs a second function which is different from the first function.

11 Claims, 4 Drawing Sheets

APPARATUS AND METHOD FOR SENSING POSITIONAL ORIENTATIONS OF A PORTABLE TERMINAL

This application is a Continuation-in-Part of Ser. No. 07/892,889, filed Jun. 3, 1992, and Ser. No. 08/113,831, filed Aug. 9, 1993, and is related to Ser. No. 47,340, filed Apr. 19, 1993, now U.S. Pat. No. 5,268,564, issued Dec. 7, 1993, which is a Continuation of Ser. No. 772,745, filed Oct. 7, 1991, now abandoned, which is a Division of Ser. No. 562,130, filed Aug. 3, 1990, now U.S. Pat. No. 5,151,580.

TECHNICAL FIELD

The instant invention relates to devices for reading optically encoded information of varying densities, for example bar codes, and to associated data input devices.

BACKGROUND ART

Optically encoded information, such as bar codes, have become quite common. A bar code symbol consists of a series of light and dark regions, typically in the form of rectangles. The widths of the dark regions, the bars, and/or the widths of the light spaces between the bars indicates the encoded information. A specified number and arrangement of these elements represents a character. Standardized encoding schemes specify the arrangements for each character, the acceptable widths and spacings of the elements the number of characters a symbol may contain or whether symbol length is variable, etc.

To decode a bar code symbol and extract a legitimate message, a bar code reader scans the symbol to produce an analog electrical signal representative of the scanned symbol. A variety of scanning devices are known. The scanner could be a wand type reader including an emitter and a detector fixedly mounted in the wand, in which case the user manually moves the wand across the symbol. As the wand passes over the bar code, the emitter and associated optics produce a light spot which impacts on the code, and the detector senses the light reflected back from the light spot passing over each symbol of the code. Alternatively, an optical moving spot scanner scans a light beam, such as a laser beam, across the symbol; and a detector senses reflected light from the beam spot scanned across the symbol. In each case, the detector produces the analog scan signal representing the encoded information.

A digitizer processes the analog signal to produce a pulse signal where the widths and spacings between the pulses correspond to the widths of the bars and the spacings between the bars. The pulse signal from the digitizer is applied to a decoder which first determines the pulse widths and spacings of the signal from the digitizer. The decoder then analyzes the widths and spacings to find and decode a legitimate bar code message. This includes analysis to recognize legitimate characters and sequences, as defined by the appropriate code standard.

Different bar codes have different information densities and contain a different number of elements in a given area representing different amounts of encoded data. The denser the code, the smaller the elements and spacings. Printing of the small size denser symbols on an appropriate medium is exacting and thus is more expensive than printing large size low resolution symbols.

A bar code reader typically will have a specified resolution, often expressed by the size of its effective sensing spot. The resolution of the reader is established by parameters of the emitter or the detector, by lenses or apertures associated with either the emitter or the detector, by the threshold level of the digitizer, by programming in the decoder, or by a combination of two or more of these elements.

In a laser beam scanner, the effective sensing spot may correspond to the size of the beam at the point it impinges on the bar code. In a wand using an LED or the like, the spot size can be the illuminated area, or the spot size can be that portion of the illuminated area from which the detector effectively senses light reflections. By whatever means the spot size is set for a particular reader, the photodetector will effectively average the light detected over the area of the sensing spot. In one prior art example, U.S. Pat. No. 4,675,531 to Clark et al., an LED illuminates the bar code and images the code onto a photodetector. The aperture of the photodetector determines the resolution or "spot size." In the Clarke et al. system the photodetector effectively averages the light detected over the area of the aperture.

A high resolution reader has a small spot size and can decode high density symbols. The high resolution reader, however, may have trouble accurately reading low density symbols because of the lower quality printing used for such symbols. This is particularly true of symbols printed by a dot matrix type printer. The high resolution reader may actually sense dot widths within a bar as individual bar elements. In contrast, a low resolution reader detects an average intensity using a large spot size and can decode low density noisy symbols. However, a reader for relatively noisy symbols of low density, such as the dot matrix symbols, senses and averages such a wide spot that two or more fine bars of a high resolution symbol may be within the spot at the same time. Consequently, a reader having a low resolution, compatible with dot matrix symbols, can not accurately read high density symbols. Thus any reader having a fixed resolution will be capable of reading bar codes only within a limited range of corresponding symbol densities.

Commonly assigned U.S. patent application Ser. No. 07/735,573 filed Jul. 25, 1991, to Barkan et al., discloses a wand or scanner system for reading optically encoded information having a wide range of densities. The system includes either optical or electronic means to derive two or more channels of data from each scan pass of the wand or scanning beam over a bar code. Each channel of data has a different resolution, and the proposed system analyzes data from the two channels to obtain a valid result over a wide range of information densities. The optical and/or electronic solutions proposed in that application, however, are complex. The resulting system becomes costly, and the wand or scanner becomes larger and heavier due to the added components. A large, heavy handheld unit causes fatigue and discomfort when a user must hold and operate the unit for protracted periods.

Clearly a need exists in the art for a bar code reader which can be readily adapted to reading bar codes over a wide range of symbol densities without adding undue complexity.

Further problems arise from association of the optical reader with other devices connected to a common computer system. In actual use, the device for reading optically encoded information typically connects to some form of computer. Often a need exists for entry of other data, in addition to that scanned by the optical reader. For example, in an inventory system using bar code readers the operator scans an item and then enters the quantity of such items presently in stock. Consequently, in most systems using optical readers of the type discussed above, the system will include additional data entry devices coupled to the same computer. Separate data entry devices, however, are often inconvenient to carry along in conjunction with a portable optical reading device. Also, the use of multiple data input devices requires use of several of the option card slots of the computer and additional physical wiring connections. Furthermore, multiple input devices often create software problems directing the multiple data input streams to a single application program running on the computer.

To alleviate these problems, a number of optical readers incorporate a keyboard and an alphanumeric display to form an integrated data entry terminal. These integrated terminals have included both contact wand type bar code readers and pistol grip type moving spot scanners. The data entry capabilities of such integrated terminals, however, have been limited by the nature of the keyboard and display.

A number of other types of data entry devices are known, and in many applications provide more convenient or "user friendly" data entry operation than do keyboards and alphanumeric displays. For example, a mouse allows a computer operator to move a cursor to point at an option illustrated on a display screen. The operator then "clicks" a button on the mouse to select the particular option. The mouse can also provide graphics data input. U.S. Pat. No. 4,906,843 to Jones et al. discloses a combination mouse and optical scanner, but the optical scanner scans characters or graphics data, not optically encoded information such as bar codes. The user manually scans characters by moving the mouse across the surface on which the characters appear.

A number of other keyboardless, data entry terminals have been proposed. U.S. Pat. No. 4,972,496 to Sklarew, for example, discloses a terminal device having a flat transparent input screen for generating input information when an operator contacts the screen with a stylus. A display screen mounted below the input screen displays symbols and graphic information drawn by the stylus. The operator inputs information into the associated computer through pen strokes essentially as if writing on a tablet with a pen. U.S. Pat. No. 4,916,441 to Gombrich discloses a handheld terminal including a non-contact point source type bar code reader and a touch sensitive display screen.

From the above discussion it should be clear that a need still exists to further develop various computer input devices integrated with means to scan optically encoded indicia which also provide convenient operation.

DISCLOSURE OF THE INVENTION

Objectives:

An objective of the present invention is to provide an integrated data entry terminal for optically reading encoded information and for convenient input of other forms of data.

More specifically, one objective is to combine a bar code reader with a display and touch sensitive type data entry terminal, particularly where the bar code reader is a moving spot scanner.

Summary:

In accordance with the present invention, a portable terminal is provided with sensor to activate certain functions of the terminal. The terminal is configured preferably having a data input and display device on the flat front surface of the terminal housing. The terminal may be capable of functioning as a bar code reader and include a light emitter which emits a light beam from a window in the housing toward indicia, on a target at a distance from the terminal, having parts of different light reflectivity. An optical sensor, such as a charge coupled device, or a photodetector, such as a photodiode, is also included in the terminal for receiving, through the same or a different window in the housing, reflected light from the indicia to produce electrical signals representative of the indicia. The data input and display device may be a touch screen display, such as a touch sensitive panel.

The light emitter preferably includes a scanner motor, such as described in U.S. Pat. No. 5,191,197 or application Ser. No. 07/897,664, and the sensor detects specific positional orientations of the terminal, such as a position of the terminal wherein (i) the long edge or flat face of the terminal is substantially parallel to the ground, i.e. orthogonal to the direction of gravitational forces, (ii) the terminal is held or supported at an angle of between 30° and 90° from the ground with the top part of the terminal facing away from the ground, and (iii) the terminal is held or supported at an angle of between 30° and 90° from the ground with the top part of the terminal facing towards the ground. For example, when substantially parallel to the ground, the terminal components and/or circuitry may be deactivated. By deactivating all circuitry and components, the terminal itself can be fully deactivated in this manner. Such deactivation can be accomplish using a time out circuit or a software interrupt routine. When the terminal is placed in the angular position with the top part facing away from the ground, a touch screen on the terminal may be activated to serve as a data input device. Placing the terminal in the angular position with the top part facing towards the ground allows the optical scanning components and/or circuitry within the terminal to be activated by touching the touch screen, perhaps to scan optically encoded bar code or other type symbols attached to boxes resting on a floor or the ground.

Thus, one or more sensors may be provided for sensing different specific positional orientations of the terminal, such as being held substantially parallel, angular or orthogonal to the ground. Hence, a change in position from one specific positional orientation to another is detected. In one specific position the terminal can be activated to perform a first function, such as accepting operator inputs, while in another positional orientation the terminal can be activated to perform a second function, such as optical scanning, which is different from the first function. In still another positional orientation the terminal, or components or circuitry, may be deactivated. The terminal can be activated, or turned "on", upon sensing a change in position, and thus movement of the terminal.

According to other aspects of the invention, the terminal includes circuitry or other means responsive to detection of a change from one to another positional orientation for respectively (i) interpreting touches of the touch sensitive display as, for example, operator inputs to data entry software or (ii) responding to a touch of the touch sensitive display by activating the light emitting and reflected light detector.

According to still other aspects of the invention, the terminal is hand held during operation and the positional orientation sensor is a switch which establishes two circuits. One of the circuits is established and activated when the terminal is oriented in the first positional orientation and the other when the terminal is oriented in the second positional orientation. The switch may be a mercury, contact, photosensor or other type switch.

In accordance with one configuration of the terminal, the first or second positional orientation of the terminal is determined by whether the device is being held by a right or left hand during use. The switch may be a spring loaded manually activated contact or trigger switch located on the surface of the housing. Such a switch is particularly suitable for detecting whether the terminal is being held by the left or right hand of an operator. For example the switch can be positioned such that when the terminal is held in the left hand the switch is depressed. Depressing the switch causes one of the switch circuits to be closed, thereby activating, say, a touch sensitive display to receive the operator's inputs. When the device is held in the right hand the spring loading causes the switch to be placed in an "up" position. This results in the other switch circuit being closed, thereby activating the touch sensitive display to respond to an operator's touch by, for example, activating the light emitter and detector. Photosensors could be beneficially used in lieu of the contact switch in this configuration.

In accordance with other aspects of the invention, the terminal housing may have substantially the shape of a tablet with first and second planar surfaces. The first and second surfaces may be front and rear surfaces or other outer housing surfaces. The location(s) of the window(s) for emitting light and receiving reflected light, are selected so that hand held operation of the terminal will not interfere with such emission or reception of light. The touch sensitive display is disposed on a surface of the housing other than that on which the window(s) are located. It is normally beneficial for the display to face the operator of the terminal by, for example, being located on a front surface of the housing. The touch sensitive display and the emitter/receiver are typically and beneficially activated alternatively.

According to still further aspects of the invention, the emitter emits the light beam substantially perpendicular to one surface of the housing, e.g. the surface having the window through which the light beam passes. The window may beneficially be located on a housing surface which is parallel to the surface of the housing on which the display is disposed.

According to yet other aspects of the invention, the surface of the housing on which the touch sensitive display is disposed on a first outer surface on a first side of the housing. A second outer surface is on a second side of the housing different than the first side of the housing. It is preferable that the light beam be emitted and the reflected light be received through a window or windows in the second outer surface of the housing. A third outer surface is on a third side of the housing different than the first and second sides of the housing. The terminal is capable of being supported on a base, such as a table, in different positional orientations. In one positional orientation, the second outer surface of the housing bears, for example, against a table surface to support the terminal. In the other positional orientation, the third outer surface of the housing bears against the table surface to support the housing.

Preferably, the first side of the housing is opposite the second side of the housing, and the third side of the housing is between the first and second sides of the housing. In one positional orientation, with the second side of the housing bearing against the table surface, the touch sensitive display will be substantially parallel to and facing up from the table surface so that it is easily used for data inputting. In another positional orientation, with the third side of the housing bearing against the table surface, the touch sensitive display is substantially orthogonal to the surface of the table and the emitter/receiver have a clear field of view onto a targeted symbol. In this orientation, touching the display activates the optical scanning components. If desired the emitter and/or receiver can be deactivated in one of the positional orientations, for example when the device is laid flat on the base with the display facing up. The deactivation can be timed such that deactivation only occurs when the device has not been used to input data during a preselected time period. A time out circuit or software interrupt routine can be used for this purpose.

Typically, the light beam emitted by the scanners of the present invention will be in the visible range of the spectrum, for example red light. Consequently, the beam scan across the code or indicia will be visible to the operator. Also, the decode logic can provide a "beep" signal as an audible output upon detection of a valid read result. The visible beam and the "beep" signal provide feedback to the operator as to the operation of the scanner.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

The optical reader of the present invention can take many forms, and may be combined with other means to enter data other than the optically encoded data.

Commonly assigned application Ser. No. 07/193,265 filed May 11, 1988 now U.S. Pat. No. 5,144,120, discloses a mirrorless optical scanner, and application Ser. No. 07/699,417 filed on May 13, 1991, now U.S. Pat. No. 5,191,197, discloses incorporation of such a scanner in a modular scanner component system facilitating use of the scanner in a variety of different housing configurations. Commonly assigned application Ser. Nos. 08/218,959, filed Mar. 28, 1994, and 08/237,531, filed May 3, 1994, disclose optical scanners with scanner motors which utilize flexible plastic strips, such as MYLAR(TM) strips. For the scanner embodiments, the present invention preferably uses a scanner similar to that disclosed in these copending applications. The disclosures of these two applications are incorporated herein by reference in their entirety.

The display and touch panel of device 54 may comprise the integrated liquid crystal display and optical touch panel disclosed in U.S. Pat. No. 4,916,308 to Meadows.

Figure 1A:
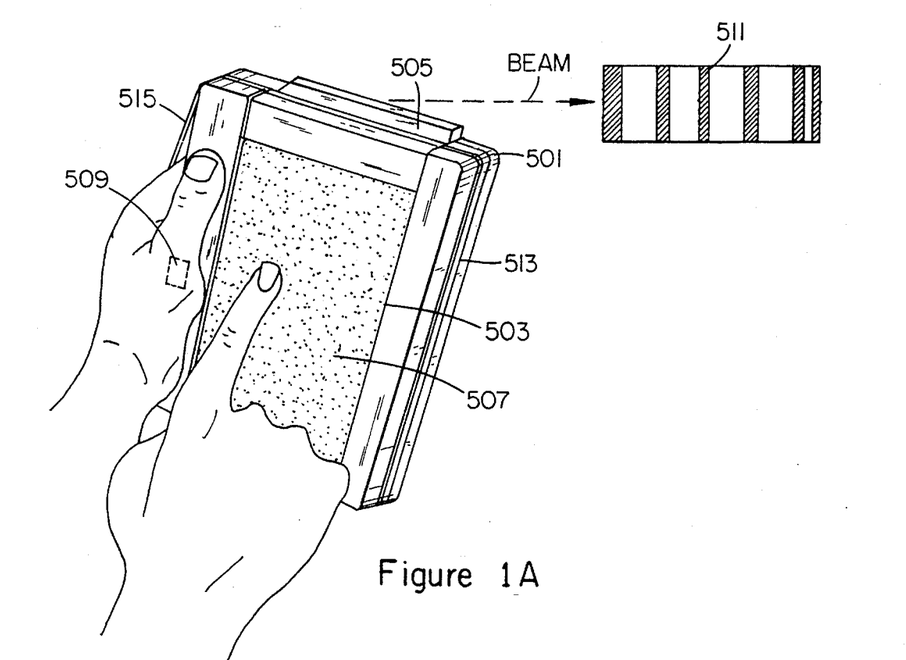
FIGS. 1A and 1B show another embodiment of an integrated data input terminal having a moving spot scanner and a touch screen display and input device.
Figure 1B:
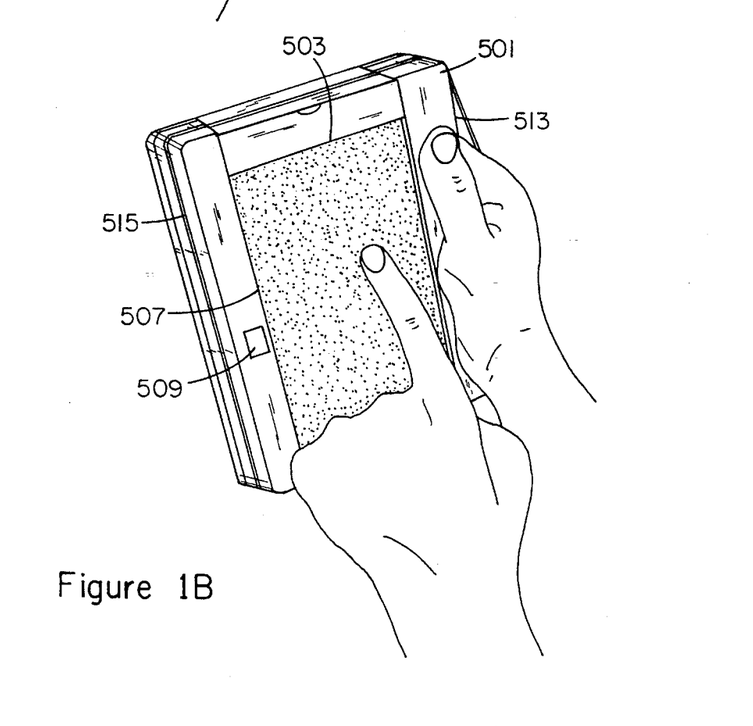

The embodiment of FIGS. 1A and 1B, incorporates the moving spot scanner and data input device 507, as described in the commonly assigned applications referenced above (one of which has now issued as U.S. Pat. No. 5,144,120) and in U.S. Pat. No. 4,916,308, into a flat panel or tablet type unit or terminal 501 with a touch sensitive display and data input panel 503. The scanner is positioned within the flat panel unit so as to emit the beam toward a bar code 511 or other indicia and receive light reflected from the bar code 511 through a scanner window 505 in the rear surface of the unit.

A switch 509 within the unit, for example a switch similar to switch 42 of FIG. 10B or a mercury switch, spring loaded manual switch or active or passive photosensor switch, is sensitive to the orientation of the unit. When oriented for holding with the right hand using a strap 513 (FIG. 1B), the switch conditions the associated electronics to operate the panel as a display and touch sensitive data input device. In this mode, the touch display 503 allows the user to input function selections and/or data simply by touching a position on the display 503, as in FIG. 1B. When oriented for holding with the left hand using strap 515, as in FIG. 1A, the switch conditions the associated electronics to operate the unit as an optical reader. In this mode, a touching of the display 503 acts as a trigger to activate the moving spot scanner device 507 and read optically encoded information from bar code 11 scanned by the emitted beam.

Figure 1C:
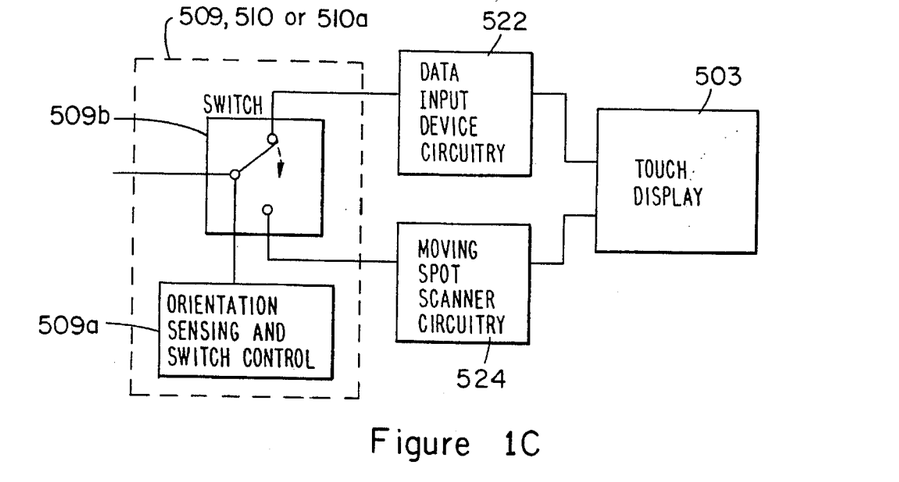
FIG. 1C is a simplified schematic depiction of the switch circuitry which may be utilized in the FIGS. 1A and 1B embodiment.

FIG. 1C is a simplified schematic depiction of the switch circuitry described above with reference to FIGS. 1A and B. The schematic shows switch 509 with associated circuitry. The switch has an orientation sensing and switch control portion 509a which is sensitive to the orientation of the unit and a dual contact portion 509b which conditions, according to the sensed orientation, the associated electronics, i.e. data input device circuitry 522 and moving spot scanner circuitry 524. The switch 509 could, for example be connected in a conventional manner to a power source, such as a battery, or to other circuitry, such as that shown in FIG. 3B, from which the power is transmitted through the switch. In one positional orientation, the electronics associated with circuitry 522 are conditioned to operate as a data input device when the touch display 503 is touched. Alternatively, in a second orientation, the electronics associated with circuitry 524 are conditioned to operate as an optical reader when the touch display 503 is touched.

Figure 1D:
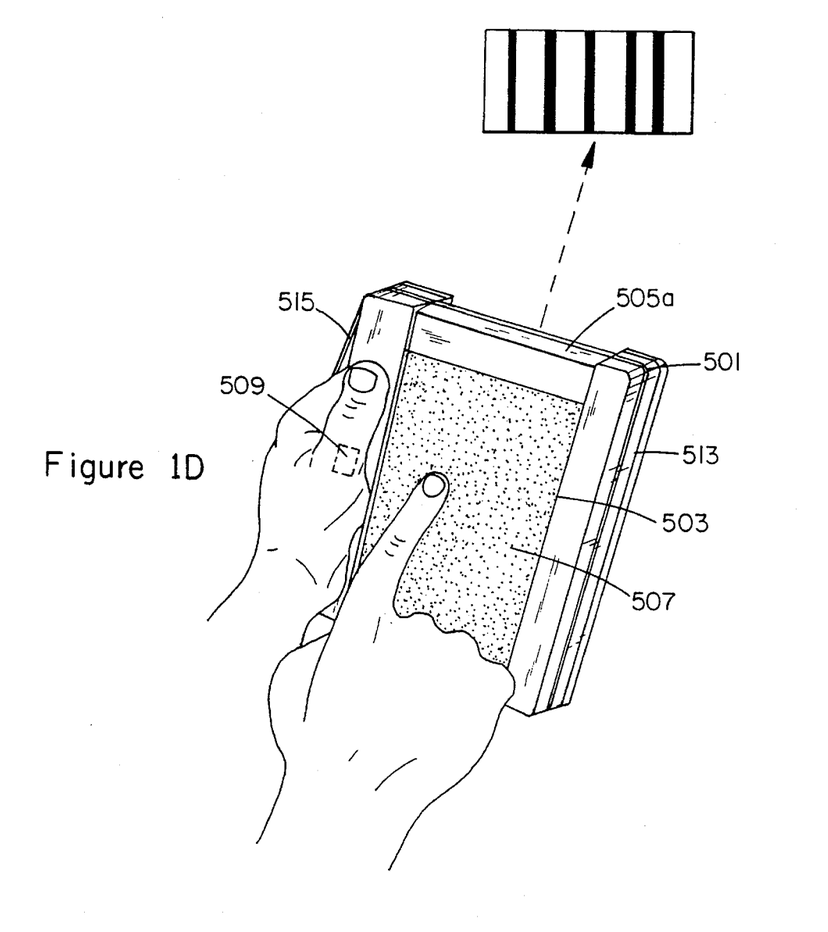
FIG. 1D is a modified version of the integrated data input terminal of FIGS. 1A and 1B.

FIG. 1D depicts a modified version of the data input terminal of FIGS. 1A and 1B. The terminal is identical to that shown in FIGS. 1A and 1B except that the light beam is emitted from a window at the top of the terminal rather than from a window on an upper portion of a side surface of the terminal as shown in FIG. 1A. Thus as shown, the window 505a allows light to be emitted from and reflected light to be received through the top surface of the data terminal. In this configuration, indicia reading would typically be performed by holding the data input terminal in the left hand, with the touch screen display approximately parallel to the ground; however, the terminal could be held with the left hand in virtually any position necessary to obtain a read of the targeted indicia.

Figure 2A:
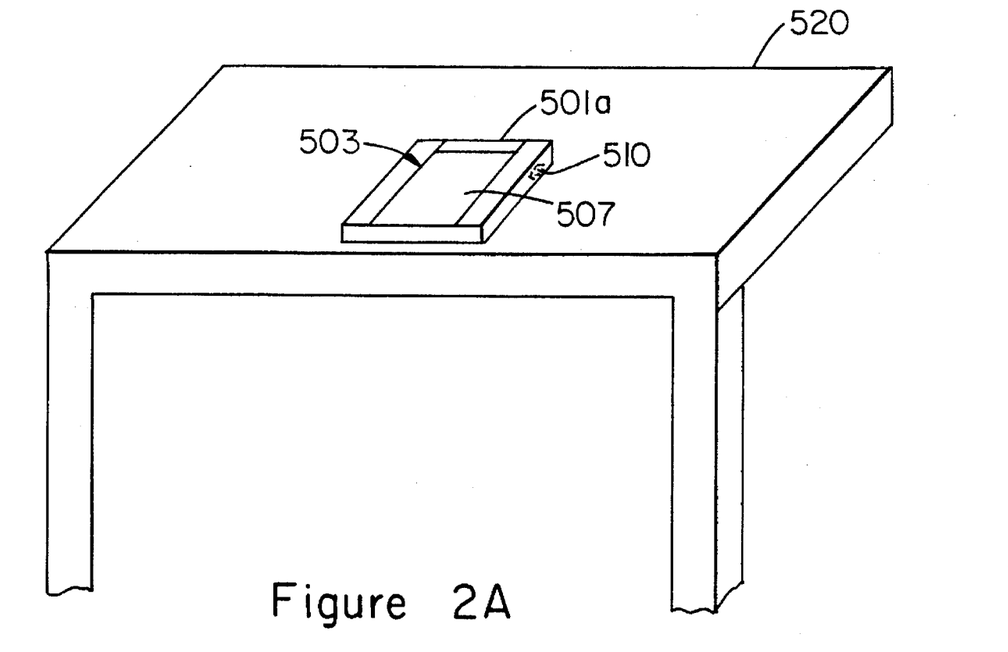
FIGS. 2A and 2B show an integrated data input terminal similar to that of FIGS. 1A and 1B but with a mercury switch mechanism.
Figure 2B:
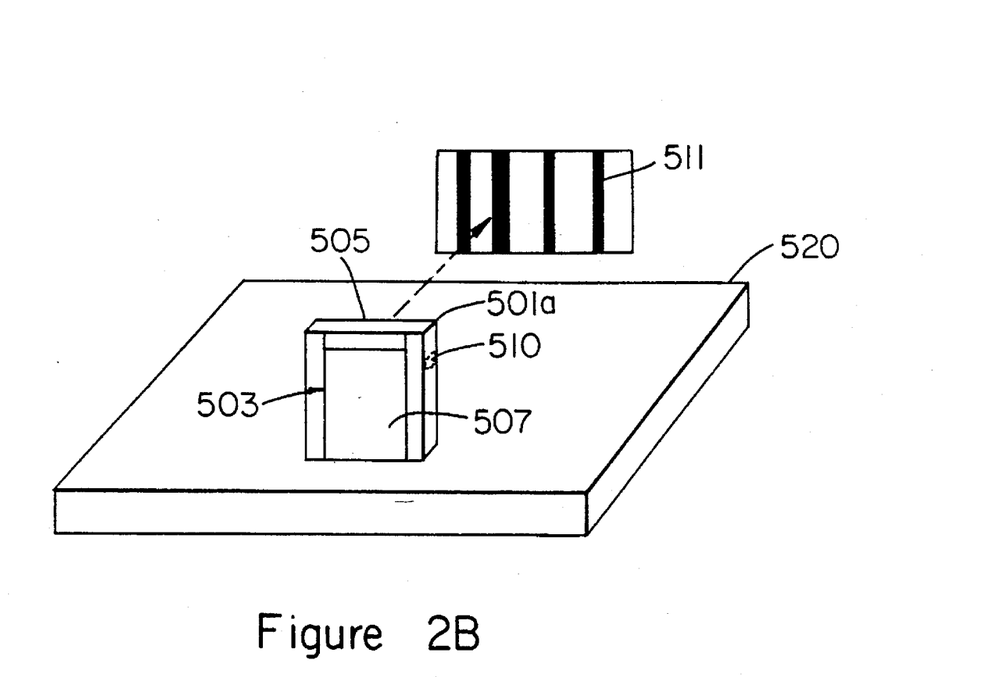

FIGS. 2A and 2B show a somewhat modified version of the touch sensitive display unit of FIGS. 1A and 1B. The unit of FIGS. 2A and 2B is identical to that of FIGS. 1A and 1B except as noted below, and the same reference numerals are used to identify like elements.

Referring first to FIG. 2A, the terminal 501a is supported on a table 520 although any type of support base could be used. The terminal includes a touch sensitive display 503 on a flat front surface of the housing, a data input device 507 which accepts data input using the touch sensitive display 503, a scan window 505 in the rear upper surface of the housing, and a switch 510 which is used to detect positional orientation of the terminal housing like switch 509 but is a mercury switch rather than a spring loaded contact switch as shown in FIGS. 1A and 1B. The mercury switch 510 is oriented diagonally between the front and rear housing surfaces, for example, at a 45° angle.

In one orientation, the terminal 501a is resting flat upon the table 520 with the display 503 facing upward. In this orientation, the display 503 and input device 507 are conditioned to operate conjunctively as a data input device. The mercury in switch 510 flows to one end of the switch, i.e. the end of the switch 510 closest to the top and rear surface of the terminal, and thereby closes a circuit which conditions the terminal to operate as a data input device. In this orientation, the optical scanning components in the terminal are not activated.

Referring now to FIG. 2B, when the terminal 501a is supported vertically on the table 520 by the bottom surface of the terminal 501a housing, i.e. the display 503 is substantially orthogonal to the table surface, the display 503 acts as a trigger to activate or turn "on" optical scanning components which emit a light beam and detect reflected light received through a window 505 in the upper rear surface of the terminal 501a housing. This occurs because, with the unit 501a supported vertically on the table, the mercury flows to the other end of the mercury switch 510, i.e. the end closest to the bottom and front surface of the terminal, and thereby closes a circuit conditioning the terminal to operate as an optical scanning device. Because of the transfer away from the top end of the switch the data input circuitry is deactivated with the terminal in this orientation.

It may be beneficial, for certain applications, to modify the functionality of switch 510 such that, in the position shown in FIG. 2A, the terminal 501a is deactivated if no data is input within a particular period of time. Various well know conventional techniques could be utilized to automatically deactivate the unit during the period of non-usage. For example, an in line timed sensor switch (not shown) could be serially located between display 503 and input device circuitry 522 to detect the timing of signals transmitted between the two circuit elements. The sensor switch opens if transmitted signals have not been detected within a predetermined time threshold thereby deactivating the terminal or selected components or circuitry within the terminal. Alternatively, a software interrupt routine could be utilized to deactivate terminal 501a when neither operator input nor an electrical signal from the optical detector has been received over a predetermined time period. Other alternative techniques could be used to likewise deactivate the unit during periods of non-use and/or when the unit is oriented in a flat position.

Figures 3A, 3B:
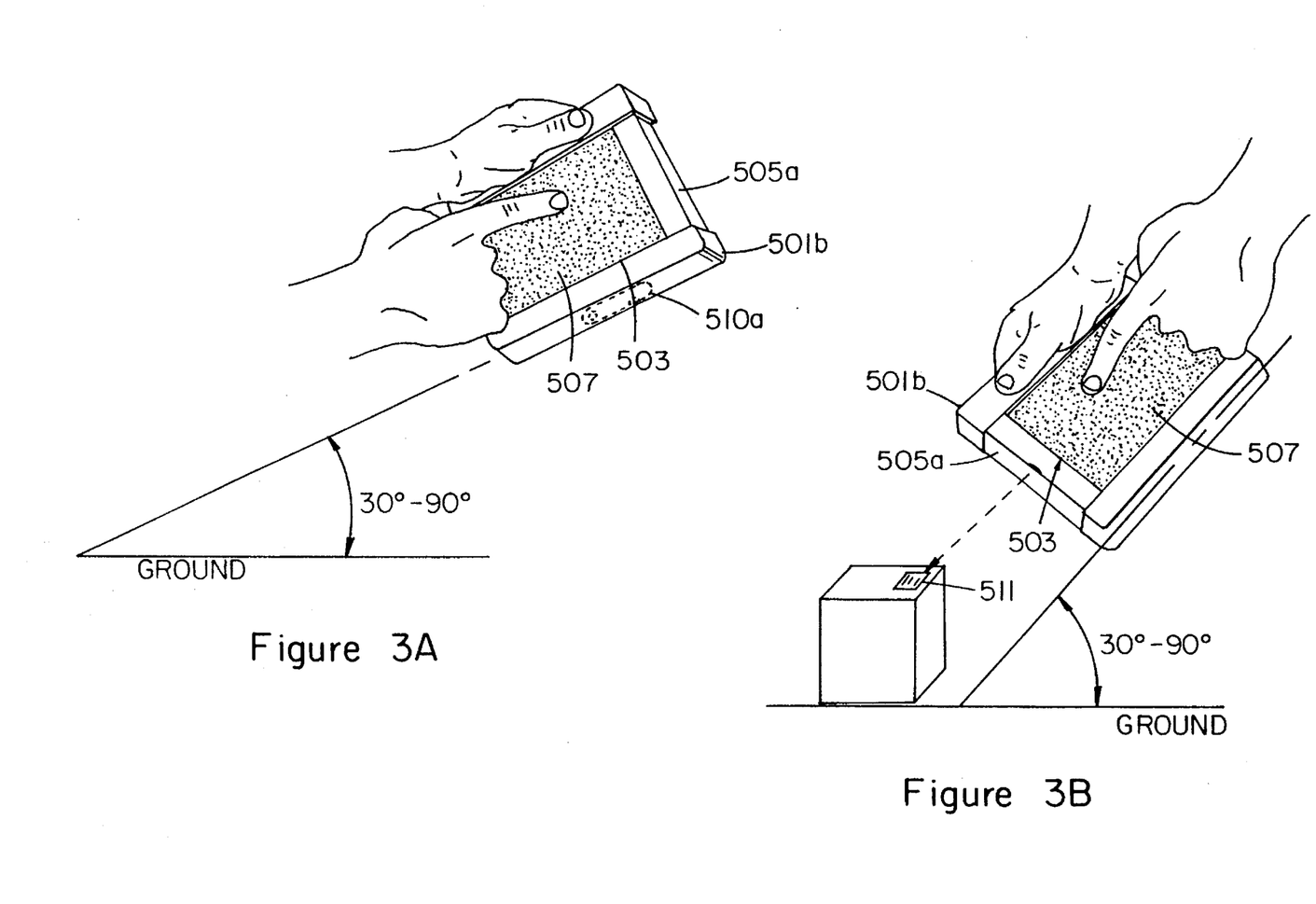
FIGS. 3A and 3B show a modified version of the integrated data input terminal of FIGS. 2A and 2B.

FIG. 3A depicts a somewhat modified version of the portable terminal of FIGS. 2A and 2B. As shown in FIG. 3A terminal 501b is designed for hand held operation and includes a mercury switch 510a. Other elements are identical to those described previously with reference to FIGS. 2A and 2B and are noted with identical numeric reference numbers. As depicted in FIG. 3A when the terminal 501b is oriented at an angle between 30° and 90° from the plane of the ground with the window 505a, through which light is emitted from and received by the terminal, pointed away from the ground the mercury in mercury switch 510a collects at a lower end of the mercury switch. In this orientation, the switch 510a activates the data input device circuitry 522 of FIG. 1C, as described previously. Accordingly, in this orientation, the terminal operates as a data input device allowing the operator to input data as desired.

FIG. 3B depicts the terminal 501b oriented at an angle 30° to 90° from the ground but with window 505a pointing towards the ground. In this orientation, the mercury is forced by gravity to the other or upper end of the mercury switch 510a and activates the moving spot scanner circuitry 524 of FIG. 1C, as described above. When so oriented, the touch display 503 is used to activate the optical scan components within terminal 501b to obtain a read of optically encoded information, such as that contained in barcode 511 on packages located at or near ground level.

Like terminal 501a of FIGS. 2A and 2B, terminal 501b of FIGS. 3A and 3B may be automatically deactivated when the terminal is held or otherwise supported, e.g. laid on a table top, in an orientation which is substantially parallel to the ground. In this orientation, the mercury moves from either end of the switch 510a to a position substantially centered between the ends of the mercury switch. A shallow cavity or indentation is provided between the ends of the mercury switch and along one or more flow paths to collect and retain the mercury between the switch ends. With the terminal in this orientation, neither the data input device circuitry 522 nor the moving spot scanner circuitry 524 of FIG. 1C is activated. Thus the terminal goes into a deactivated state.

Because of the commonality of functionality of switches 509, 510 and 510a, the circuit diagram of FIG. 1C is equally applicable to the terminals of FIGS. 2A/2B, FIGS. 3A/3B and FIGS. 1A/1B, notwithstanding the differences in the type of switch utilized in each of the particular configurations. The FIG. 1C circuit would likewise be applicable if active or passive photosensors rather than spring or mercury switches were utilized since the functionality of the switch would remain the same.

Typically, the light beam emitted by the scanners of the present invention will be in the visible range of the spectrum, for example red light. Consequently, the beam scan across the code or indicia will be visible to the operator. The decode logic may reside within the same housing as the scanner, for example in the integrated terminal embodiment, or the decode logic may be software resident in the associated computer system. The decode logic can provide a "beep" signal as an audible output upon detection of a valid read result. The visible beam and the "beep" signal provide feedback to the operator as to the operation of the scanner.

Although the integrated terminals of FIGS. 1A, 1B, 2A, 2B, 3A, and 3B have been described as using a moving spot scanner, it would be a simple matter to substitute a fixed beam emitter.

Although the various configurations of the invention have been discussed with reference to the scanner housing, triggering mechanism and other features of conventional scanners, it will be understood that a variety of housing styles and shapes and triggering mechanisms could be used. Other conventional features can also be included if so desired. The invention is directed primarily to a portable hand held scanning device and thus is preferably implemented using miniaturized components such as those described in the materials referenced herein, or otherwise known in the art. However the scanner of the present invention is not limited to use in portable hand held devices and can also be easily adapted for use in any movable housing whether or not intended for hand held operation.

Additionally, even though the present invention has been described with respect to reading certain types of optical symbols such as one or two dimensional bar code and/or matrix array symbols, it is not limited to such embodiments, but may also be applicable to more complex indicia scanning or data acquisition applications. It is conceivable that the present invention may also find application for use with various machine vision or optical character recognition applications in which information is derived from indicia such as printed characters or symbols, or from the surface or configurational characteristics of the article being scanned. Further, the present invention's application is not necessarily limited to portable terminals which include an optical scanning function but could be useful in portable terminals which function exclusively outside the area of optical scanning.

In all of the various embodiments, the elements of the scanner may be implemented in a very compact assembly or package such as a single printed circuit board or integral module. Such a board or module can interchangeably be used as the dedicated scanning element for a variety of different operating modalities and types of data acquisition systems. For example, the module may be alternately used in a hand held scanner, a table top scanner attached to a flexible arm or mounting extending over the surface of the table or attached to the underside of the table top, or mounted as a subcomponent or subassembly of a more sophisticated data acquisition system.

Each of these different implementations is associated with a different modality of reading bar code or other symbols. Thus, for example, the hand held scanner is typically operated by the user "aiming" the scanner at the target; the table top scanner operated while the target is moved rapidly through the scan field, or "presented" to a scan pattern which is imaged on a background surface. Still other modalities within the scope of the present invention envision the articles being moved past a plurality of scan modules oriented in different directions so the field of view allows at least one scan of a symbol which may be arbitrarily positioned on the article.

The module would advantageously comprise an optics subassembly mounted on a support, and a photodetector component. Control or data lines associated with such components may be connected to an electrical connection mounted on the edge or external surface of the module to enable the module to be electrically connected to a mating connector associated with other elements of the data acquisition system.

An individual module may have specific scanning or decoding characteristics associated with it, e.g. operability at a certain working distance, or operability with one or more specific symbologies or printing densities. The characteristics may also be defined through the manual setting of control switches associated with the module. The user may also adapt the data acquisition system to scan different types of articles or the system may be adapted for different applications by interchanging modules in the data acquisition system through the use of a simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local or wide area network or with the telephone exchange network, either through a modem or an ISDN interface, or by low power radio broadcast, or other form of wireless communications, from a portable terminal to a stationary or mobile receiver.

It will be understood that each of the features described above, or two or more together, may find a useful application in other types of scanners and readers differing from the types described above.

We claim:

1. A portable terminal, comprising:

a housing; and a sensor for sensing different specific positional orientations of the housing;

wherein in one said positional orientation sensed by said sensor the terminal performs a first function, and in another said positional orientation sensed by said sensor the terminal performs a second function different from said first function.

2. A portable terminal according to claim 1, further comprising (i) a touch sensitive display disposed on a surface of said housing and (ii) a light emitter for emitting a light beam through a window in said housing toward indicia having parts of different light reflectivity;

wherein said first function is interpreting touches of the touch sensitive display as data input, and said second function is responding to a touch of the touch sensitive display by activating the light emitter.

3. A portable terminal according to claim 2, further comprising an optical detector for receiving reflected light from said indicia through the window in said housing and producing an electrical signal representative of said indicia;

wherein said second function further includes responding to said touch of the touch sensitive display by activating the optical detector.

4. A portable terminal according to claim 3, further comprising a processor for receiving said data input and a signal corresponding to said electric signal, wherein said processor deactivates said touch sensitive display, said light emitter and said optical detector if neither said data input nor said signal is received within a predetermined period of time.

5. A method of operating a portable terminal comprising the steps of:

sensing different specific positional orientations of the portable terminal;

performing a first function with said portable terminal in one said positional orientation; and performing a second function different from said first function with said portable terminal in another said positional orientation.

6. A method according to claim 5, further comprising the steps of:

touching a portion of said portable terminal with said portable terminal is in said one positional orientation to perform said first function; and touching said portion of said portable terminal with said portable terminal in said another positional orientation to perform said second function.

7. A method according to claim 5, wherein said first function includes emitting a light beam from said portable terminal toward indicia separated from said terminal and having parts of different light reflectivity.

8. A method according to claim 7, wherein said first function further includes receiving reflected light from said indicia and producing an electrical signal representative of said indicia.

9. A method according to claim 7, wherein said second function includes inputting operator data to said terminal.

10. A method according to claim 5, further comprising the step of deactivating said portable terminal in a third said positional orientation.

11. A portable terminal according to claim 5, further comprising the step of deactivating said terminal if neither an operator input to said terminal nor a signal representing reflected light detected by said terminal is received within a predetermined period of time.

* * * * *